(12) United States Patent
Macovitz

(10) Patent No.: US 11,787,483 B2
(45) Date of Patent: Oct. 17, 2023

(54) VEHICLE SUPPORT AND ALIGNMENT SYSTEM AND METHODS OF MAKING AND USING THE SAME

(71) Applicant: Gary Macovitz, Zebulon, NC (US)

(72) Inventor: Gary Macovitz, Zebulon, NC (US)

(*) Notice: Subject to any disclaimer, the term of this patent is extended or adjusted under 35 U.S.C. 154(b) by 128 days.

(21) Appl. No.: 17/517,149

(22) Filed: Nov. 2, 2021

(65) Prior Publication Data

US 2023/0137478 A1  May 4, 2023

(51) Int. Cl.
*B62D 27/02* (2006.01)
*B25B 11/02* (2006.01)
*B60S 5/00* (2006.01)
*B62D 25/20* (2006.01)

(52) U.S. Cl.
CPC .............. *B62D 27/02* (2013.01); *B25B 11/02* (2013.01); *B60S 5/00* (2013.01); *B62D 25/2009* (2013.01)

(58) Field of Classification Search
CPC ..... B62D 27/02; B62D 25/2009; B25B 11/02; B60S 5/00
See application file for complete search history.

(56) References Cited

U.S. PATENT DOCUMENTS

| | | | |
|---|---|---|---|
| 2002/0096839 A1* | 7/2002 | Schmidt | B60R 13/0815 277/650 |
| 2011/0245950 A1* | 10/2011 | Overton | B62D 33/00 700/98 |
| 2013/0181483 A1* | 7/2013 | Tabuteau | B62D 25/025 296/193.02 |
| 2019/0077461 A1* | 3/2019 | Lackore, Jr. | B62D 21/11 |

FOREIGN PATENT DOCUMENTS

| | | | | |
|---|---|---|---|---|
| CN | 104373437 A | * | 2/2015 | F16B 5/065 |
| DE | 102017118515 B3 | * | 10/2018 | B60R 19/12 |
| WO | WO-9966134 A1 | * | 12/1999 | B62D 33/0604 |

* cited by examiner

*Primary Examiner* — Lori Lyjak
(74) *Attorney, Agent, or Firm* — Ashley D. Johnson; Dogwood Patent and Trademark Law

(57) ABSTRACT

The invention is for a system that supports and stabilizes a suspended vehicle, allowing it to be accessed and/or repaired as desired by a user. The system includes a first pair of braces that are installed parallel to the longitudinal axis of a corresponding vehicle body with the floorboard-frame unit removed. The system includes a second pair of braces positioned on a vehicle floorboard-frame unit, including brackets that can be used to align the alignments with the frame. At least one first brace includes an alignment element that extends in a downward direction towards the second pair of braces. The braces therefore each include a pair of longitudinally extending members in opposed relationship with each other, supporting the vehicle body and floorboard-frame unit, respectively.

18 Claims, 10 Drawing Sheets

VEHICLE SUPPORT AND ALIGNMENT SYSTEM AND METHODS OF MAKING AND USING THE SAME

TECHNICAL FIELD

The presently disclosed subject matter is generally directed to a vehicle suspension support and alignment system. The presently disclosed subject matter also includes methods of making and using the disclosed system.

BACKGROUND

Suspending a vehicle for repair or maintenance can be a tedious and time-consuming task. It is often desirable to elevate the vehicle above its normal use surface to access certain features and view the vehicle in its entirety. Traditionally, several varieties of lift systems have been used, such as a basement or pit system in which a person stands or lies horizontally in a pit below the ground level of the vehicle. Alternatively, high lift systems can be used, where the vehicle is lifted above the service person. However, these prior art lift systems suffer from many drawbacks. For example, basement systems require permits, expensive excavation, expensive equipment, and commonly experience problems with leaks, mold, and flooding. In addition, shallow pit systems render the service person confined to working on their back, which is uncomfortable and often causes injury. Further, high lift systems are expensive due to the technology required to lift vehicles and require regularly scheduled maintenance. Moreover, even with the prior art lifting systems, realigning a vehicle properly is tedious, takes several experienced mechanics, and often requires trial and error to get the correct vehicle alignment. Further, using conventional lifting mechanisms commonly imparts localized stresses on the vehicle, which often require substantial reinforcements. It would therefore be advantageous to provide a system and method of supporting and aligning a suspended vehicle.

SUMMARY

In some embodiments, the presently disclosed subject matter is directed to a support and alignment system for use with a vehicle. The system includes a pair of upper braces with a first end, second end, and length therebetween. The system also includes a pair of lower braces with a first end, second end, and length therebetween. The system comprises at least one alignment rod attached to each upper brace, wherein each alignment rod comprises a first end that directly contacts the upper brace, and a second end that cooperates with bracket positioned on a surface of a corresponding lower brace. When the alignment rods are positioned within a corresponding bracket on a lower brace, the pair of lower braces can be advanced towards the upper braces. Each alignment rod is aligned with a corresponding bracket. The term "aligned" refers to properly orienting an upper brace with a lower brace and the components attached thereto (e.g., the vehicle body and vehicle frame-floorboard unit).

In some embodiments, the system further includes a support brace that contacts the first end of each upper brace.

In some embodiments, the alignment rods are threaded such that each alignment rod can be advanced into a corresponding bracket.

In some embodiments, the upper braces have a length, width, and thickness that is about the same as a length, width, and thickness of the lower braces.

In some embodiments, the upper braces have a length that differs from the length of the lower braces by about 10-25 percent.

In some embodiments, the system or each brace comprises about 1-10 alignment rods.

In some embodiments, each alignment is permanently attached to an upper brace.

In some embodiments, each alignment rod is releasably attached to an upper brace.

In some embodiments, the upper braces, lower braces, or both have an adjustable length, width, or thickness.

In some embodiments, the presently disclosed subject matter is directed to a vehicle comprising the disclosed support system. The vehicle is defined by a body and a separate floorboard and frame unit, the pair of upper braces are releasably attached to a lower edge of the vehicle body, and the pair of lower braces are releasably attached to an edge of the vehicle floorboard and frame unit.

In some embodiments, the upper braces are configured parallel to each other, and the lower braces are configured parallel to each other.

In some embodiments, the presently disclosed subject matter is directed to a method of supporting and aligning a vehicle frame and floorboard in a vehicle with a separated frame and floorboard. Specifically, the method comprises installing the pair of upper braces of a support and alignment system on a lower edge of the vehicle body. The method includes installing the pair of lower braces support and alignment system on an edge of the vehicle floorboard and frame unit. The support and alignment system comprises a pair of upper braces with a first end, second end, and length therebetween; a pair of lower braces with a first end, second end, and length therebetween; at least one alignment rod attached to each upper brace, wherein each alignment rod comprises a first end that directly contacts the upper brace, and a second end that cooperates with a bracket positioned on a surface of a corresponding lower brace. The method includes suspending the vehicle body in the air and positioning each alignment rod within a corresponding bracket on a lower brace. The method includes turning the alignment rod to advance the lower braces and floorboard and frame unit towards the upper braces and vehicle body. The vehicle body is supported during suspension by the upper braces. The frame and floorboard unit is aligned with the vehicle body by positioning the alignment rods within a corresponding bracket on a lower brace.

In some embodiments, the upper braces are configured parallel to each other, and the lower braces are configured parallel to each other.

In some embodiments, the method includes attaching a support brace perpendicularly to each upper brace.

In some embodiments, the method includes removing the upper and lower braces from the vehicle body and the frame and floorboard.

In some embodiments, the presently disclosed subject matter is directed to a kit. Specifically, the kit comprises a plurality of upper braces, each with a first end, second end, and length therebetween. The kit also includes a plurality of lower braces, each with a first end, second end, and length therebetween. The kit includes a plurality of alignment rods, each comprising a first end configured to directly contact an upper brace and a second end that cooperates with a bracket positioned on a surface of a corresponding lower brace. The kit further includes a plurality of support braces, each comprising a first end and a second end.

DETAILED DESCRIPTION

Figure 1:
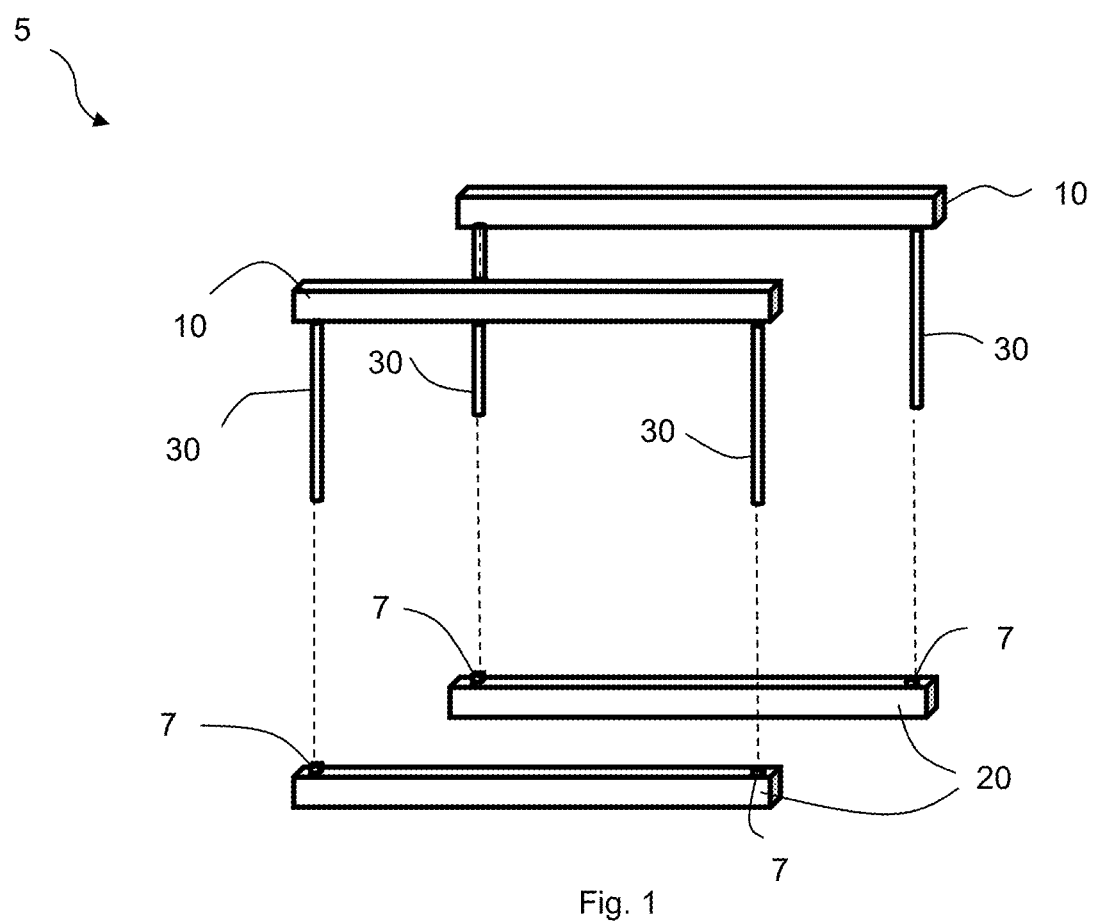
FIG. 1 is a perspective view of a support and alignment system in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to a system that supports and stabilizes a suspended vehicle, allowing it to be accessed and/or repaired as desired by a user. The term "vehicle" broadly refers to any device or structure for transporting people or objects, such as a self-propelled conveyance. Suitable vehicles can include (but are not limited to) cars, trucks, vans, buses, 4-wheelers, 3-wheelers, off-road vehicles, all-terrain vehicles, golf carts, motorhomes, boats, aircraft, and the like. The disclosed system allows a vehicle to be safely and securely lifted for repair or other maintenance, while also providing alignment to assist the service person when re-assembling the vehicle.

FIG. 1 illustrates one embodiment of system 5 comprising a pair of upper braces 10 that are installed parallel to the longitudinal axis of a corresponding vehicle body 15 with the floorboard and frame removed. As discussed in more detail below, upper braces 10 provide support for the upper portion of the vehicle body, preventing the vehicle from bending or being damaged during suspension. The upper braces include alignments 30 that can be used to align the vehicle body with the frame and floorboard unit. The vehicle "body" refers to the exterior and/or inner structure of the vehicle (e.g., excluding the vehicle frame and floorboard). The vehicle "frame" refers to main supporting structure of the vehicle to which all other components are attached. The term "floorboard" refers to support along the bottom of a vehicle, including where the driver and passengers rest their feet. The vehicle "floorboard-frame unit" refers to a single structure that includes the vehicle floorboard and frame, attached together and optionally includes one or more additional vehicle components.

The system can also include a cross brace that allows the frame to be lifted and suspended, as discussed in detail below. The system includes a second pair of lower braces 20 positioned on vehicle floorboard 25 (i.e., the floor of the vehicle), including bracket 7 that can be used to align the floorboard with the frame. For example, the alignments can be configured as threaded rods that can be activated to move the floorboard and frame towards the vehicle body, ensuring correct positioning. Braces 10, 20 therefore each include a pair of longitudinally extending members in opposed relationship with each other, supporting the frame and floorboard, respectively.

Figure 2A:
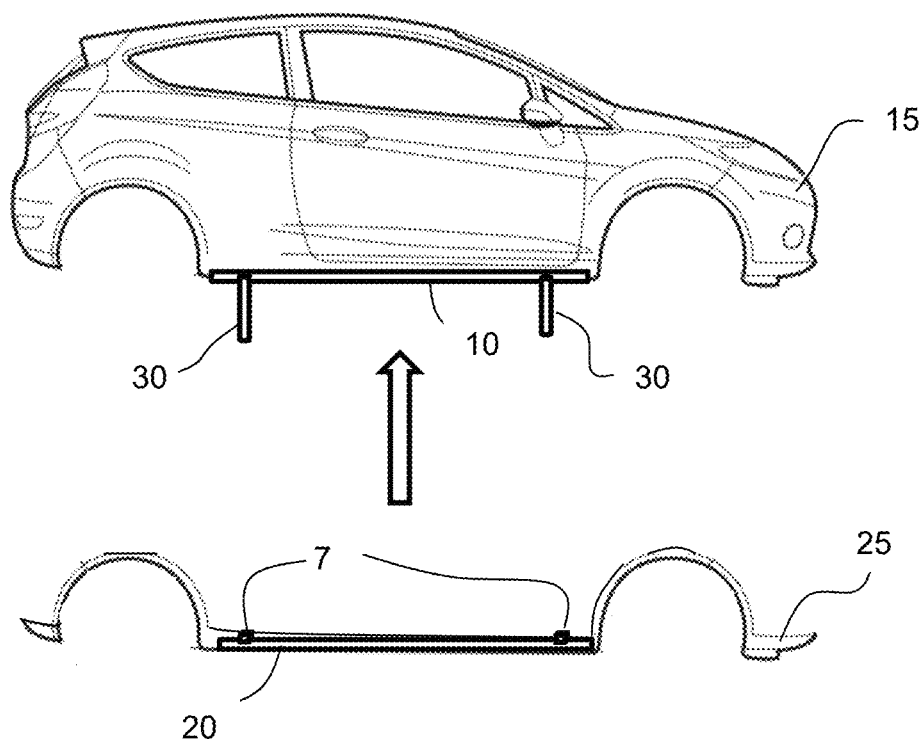
FIG. 2a is a side plan view of a vehicle floorboard and frame aligned and positioned on a vehicle body in accordance with some embodiments of the presently disclosed subject matter.
Figure 2B:
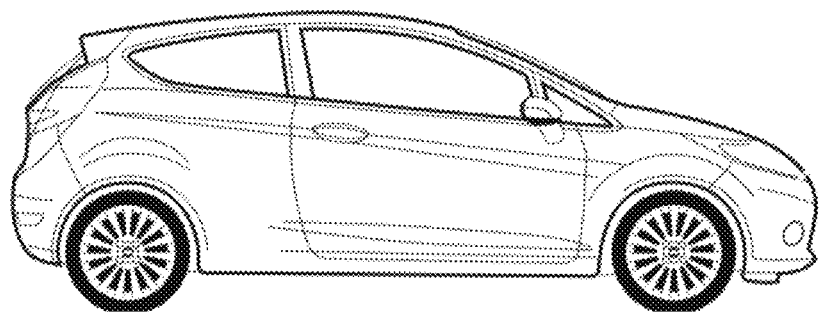
FIG. 2b is a side plan view of an aligned and reassembled vehicle in accordance with some embodiments of the presently disclosed subject matter.

FIGS. 2a and 2b illustrate one embodiment of braces 10, 20 installed on an interior or exterior surface of a vehicle body and frame-floorboard unit, respectively. As shown, alignments 30 can be rotated or otherwise activated within brackets 7 to allow the floorboard and frame unit to be raised in the proper position on the vehicle body.

Figure 3A:
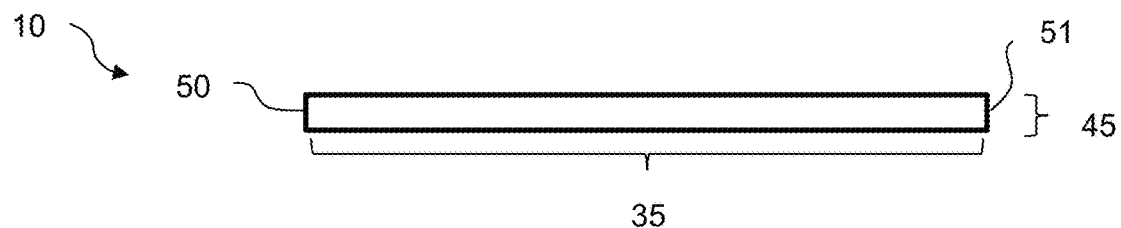
FIG. 3a is a side plan view of an upper or lower brace in accordance with some embodiments of the presently disclosed subject matter.
Figure 3B:
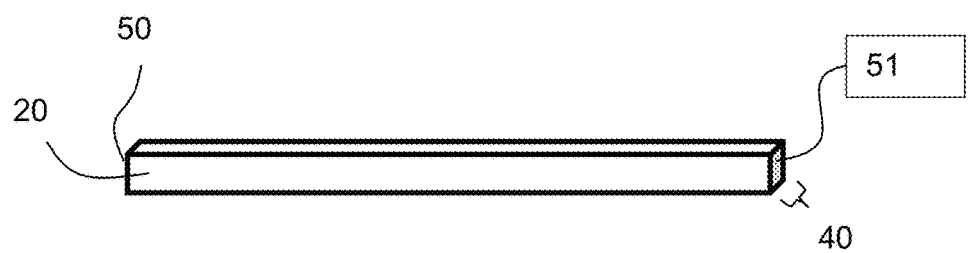
FIG. 3b is a perspective view of an upper or lower brace in accordance with some embodiments of the presently disclosed subject matter.

Braces 10, 20 can be configured in any desired size and/or shape. For example, FIGS. 3a and 3b illustrate one embodiment of a brace with length 35, width 40, and height 45. The term "length" refers to the longest horizontal straight-line distance of the brace from first end 50 to second end 51. The term "width" refers to the longest straight-line distance perpendicular to the length. The term "height" refers to the longest vertical straight-line distance of the brace.

In some embodiments, the length of braces 10, 20 can be about 25-100 inches (e.g., at least/no more than about 25, 30, 35, 40, 45, 50, 55, 60, 65, 70, 75, 80, 85, 90, 95, or 100 inches). Width 40 of braces 10, 20 can be about 1-10 inches (e.g., at least/no more than about 1, 2, 3, 4, 5, 6, 7, 8, 9, or 10 inches). The height of the braces can be about 1-10 inches (e.g., at least/no more than about 1, 2, 3, 4, 5, 6, 7, 8, 9, or 10 inches). It should be appreciated that the braces can be configured with a length, width, and/or height outside the ranges given herein.

In some embodiments, upper braces 10 can have about the same length, width, and/or height as lower braces 20. In other embodiments, the length, width, and/or height of the braces can differ by about 1-50%. For example, if the length of braces 10 are about 20 inches, the length of braces 20 can be about 10-30 inches.

Figure 3C:
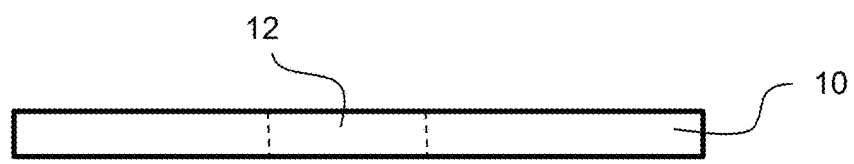
FIG. 3c is a side plan view of a brace with an adjustable length in accordance with some embodiments of the presently disclosed subject matter.

It should be appreciated that vehicles can vary widely in body construction, such that the dimensions of the braces for one vehicle may not be suitable for use in another vehicle. For this reason, the braces can have a variable length, width, and/or thickness, allowing use on a variety of different vehicles. For example, FIG. 3c illustrates one embodiment of brace 10 with insert 12 that can be added or removed to adjust the length of the brace. It should be appreciated that any element that allows a dimension of the brace to be adjusted can be used, such as addition/removal of inserts, telescoping arrangements, hinged joints, and the like.

Figure 4A:
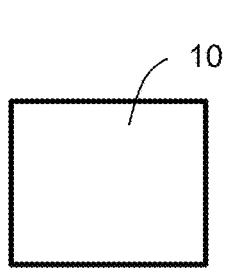
FIGS. 4a-4c are sectional views of a brace configured with a square, rectangular, and triangular cross-sectional shape in accordance with some embodiments of the presently disclosed subject matter.
Figure 4B:
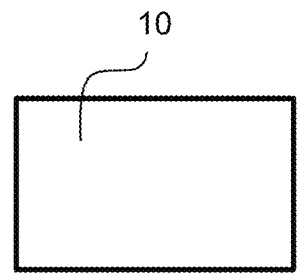
Figure 4C:
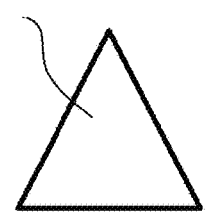

The braces can have any desired cross-sectional shape, such as square, rectangular, triangular, and the like, as shown in FIGS. 4a-4c, respectively.

Braces 10, 20 can be constructed from any desired rigid material. The term "rigid material" refers to a material with a hardness and rigidity that has little to no elastic deformation when stress is applied. In some embodiments, rigid materials include those with a value of Young's modulus greater than or equal to about 0.1 GPa. Suitable rigid materials can include (but are not limited to) steel, stainless steel, bronze, carbon composites, epoxy composites, thermoplastic materials, and the like.

Figure 5A:
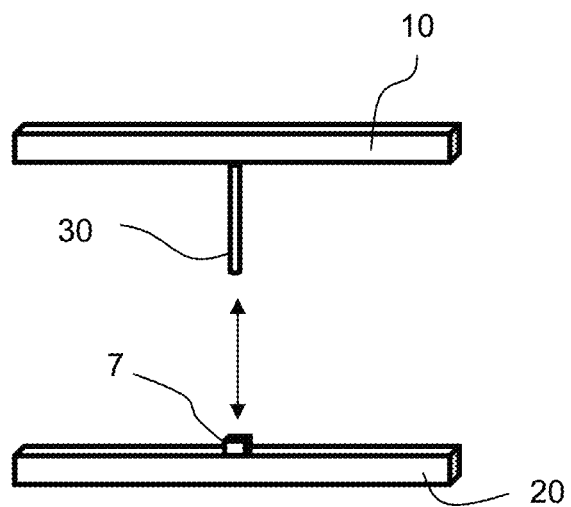
FIG. 5a is a perspective view of an upper brace aligning with a lower brace in accordance with some embodiments of the presently disclosed subject matter.
Figure 5B:
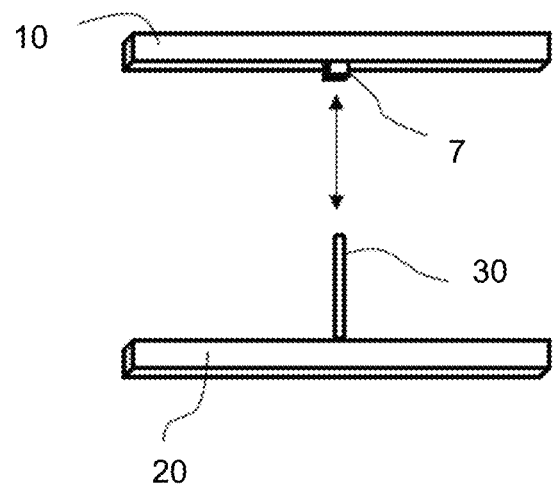
FIG. 5b is a perspective view of an upper brace aligning with a lower brace in accordance with some embodiments of the presently disclosed subject matter.
Figure 5C:
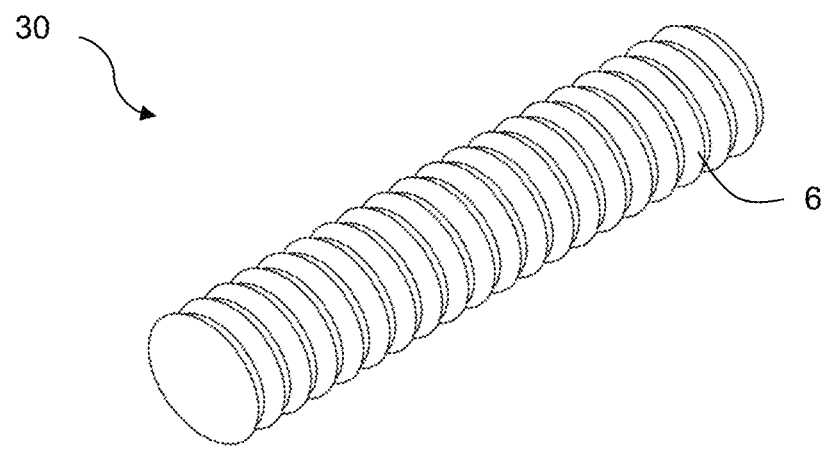
FIG. 5c is a perspective view of one embodiment of an alignment configured as a threaded alignment rod.
Figure 5D:
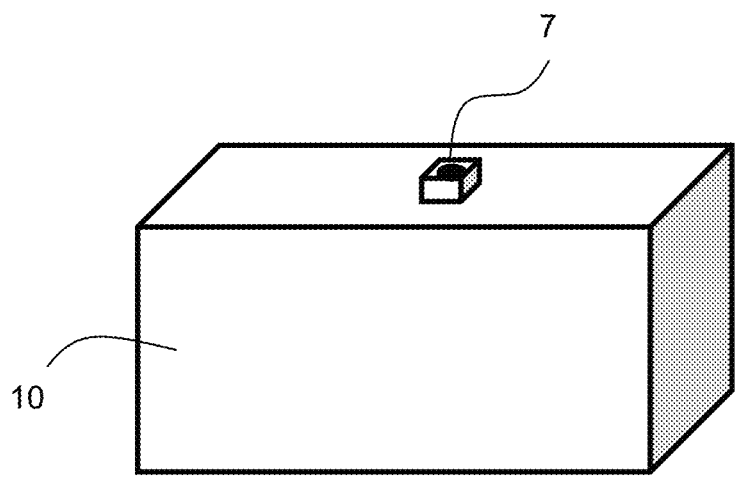
FIG. 5d is a perspective view of an upper brace comprising a threaded bracket in accordance with some embodiments of the presently disclosed subject matter.

As noted above, upper braces 30 can include one or more alignments 30 that promote alignment of the body with the frame-floorboard unit of the vehicle, as shown in FIG. 5a. The term "alignment" refers to any element that facilitates joining of the frame and floorboard in proper orientation, such as (but not limited to) rods that cooperate with corresponding apertures in upper braces 10, attractive magnets, interlocking guides, screws, bolts, clips, guides, fasteners, and the like. However, the alignment elements are not limited, so long as each lower brace includes a bracket that aligns with a corresponding alignment 30 or vice versa as shown in FIG. 5b. For example, FIG. 5a illustrates one embodiment of brace 10 comprising an alignment rod that cooperates with bracket 7 in lower brace 20. The alignment rod can include exterior threads 6 that cooperate with threads positioned within an aperture or some surface of bracket 7, as shown in FIGS. 5c and 5d. In this way, the upper and lower braces are aligned to properly position the floorboard on the vehicle frame. Stated another way, the alignment rod can be rotated after one end is inserted into the bracket. During alignment, the lower braces (and thus the floorboard-frame unit) will be advanced towards the upper braces, along the length of the alignment rod. The vehicle body is then in proper alignment with the floorboard-frame unit.

Brace 10 can include any number of alignments 30 to assist in lining up and joining of the vehicle frame and floorboard. For example, a brace can include about 1-10 alignments or more in some embodiments.

Alignments 30 can have any desired length, such as about 5-20 inches (e.g., at least/no more than about 5, 10, 15, or 20 inches). The alignments can further be constructed from any desired material, such as (but not limited to) metal, plastic, composite materials, and the like. The alignments can be releasably attached to a lower edge of braces 10 using any conventional method, such as spot welding, clips, clasps, fasteners, screws, bolts, and the like.

Figure 6A:
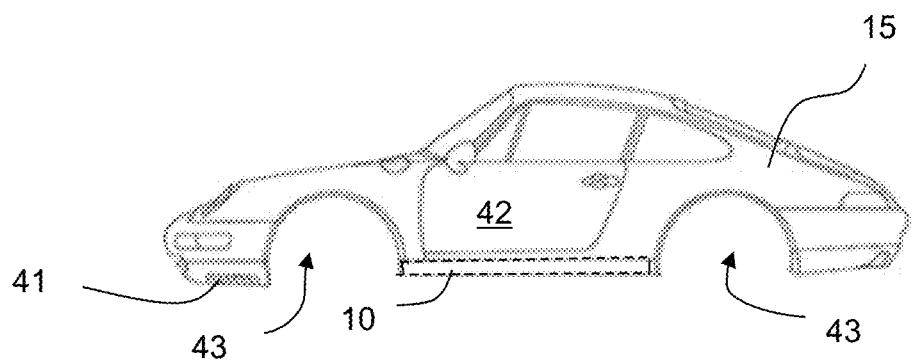
FIG. 6a is a side plan view of a vehicle body with upper braces attached in accordance with some embodiments of the presently disclosed subject matter.
Figure 6B:
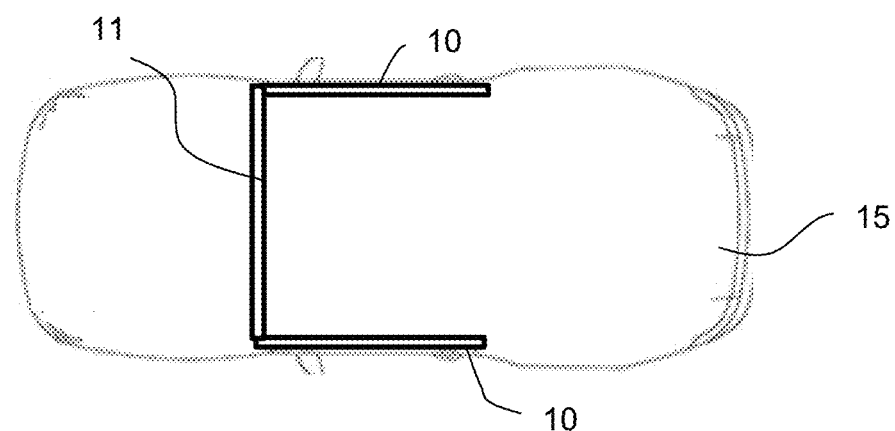
FIG. 6b is a top plan view of a vehicle with upper braces attached in accordance with some embodiments of the presently disclosed subject matter.
Figure 6C:
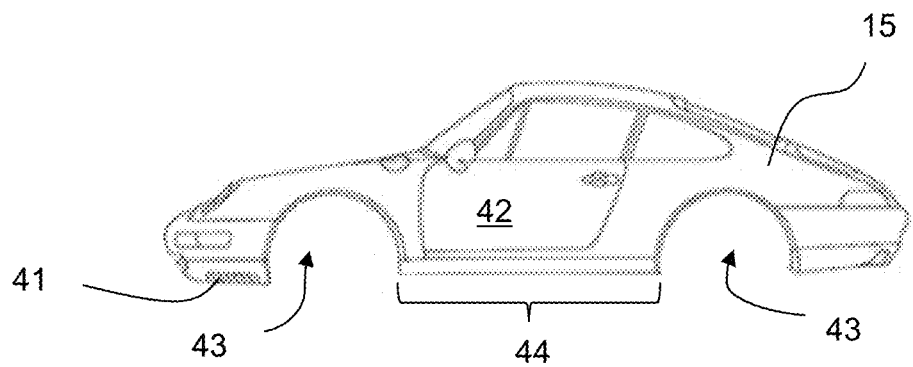
FIG. 6c is a side plan view of a vehicle body in accordance with some embodiments of the presently disclosed subject matter.

In use, braces 10 can be positioned on parallel edges of a vehicle body as shown in FIGS. 6a and 6b. Specifically, the braces can be attached within the interior of the body (e.g., within the vehicle cabin portion where the driver and passengers are positioned). In some embodiments, braces 10 are configured on lower edge 41 of the body, below where the vehicle doors 42 are positioned (if installed on the body). In some embodiments, braces 10 are configured between wheel wells 43, along or extending below the lower edge of the body. For example, the braces can span about 50-100 percent of the distance 44 between the wheel wells, as shown in FIG. 6*c* (e.g., about 50, 55, 60, 65, 70, 75, 80, 85, 90, 95, or 100 percent).

The braces can be releasably attached to body 15 using any conventional method, such as the use of screws, bolts, spot welding, and the like. The braces can be attached within the interior of the body, towards the lower edge (e.g., below the passenger and driver doors). The pair of braces 10 can be about parallel to each other. However, the presently disclosed subject matter is not limited and the frames can be attached to the exterior of the body, along the same location (e.g., lower edge, between the wheel wells).

Figure 6D:
FIGS. 6d-6f are top plan views of vehicle upper braces attached to a support brace in accordance with some embodiments of the presently disclosed subject matter.
Figure 6E:
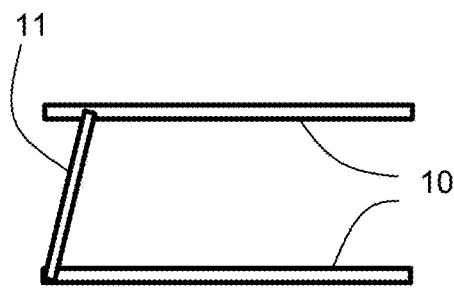
Figure 6F:
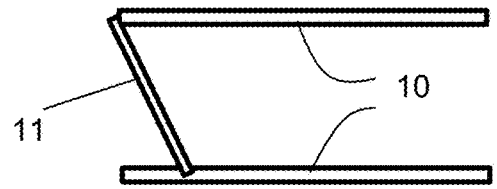

In some embodiments, at least one support brace 11 can also be attached to the frame, extending across the interior width of the vehicle body, as shown in FIG. 6*b*. The support brace is attached at each end to one upper brace 10 or to the vehicle body. The support brace can be about perpendicular or angled relative to the upper braces, as shown in FIGS. 6*d*-6*f*. The support brace allows a user to lift the vehicle, accessing the support brace through the vehicle windshield (which has been removed). For example, a chain, cable, or sling can be dropped within the interior of the vehicle body, attaching to the support brace. A hoist or other lifting mechanism can then be used to raise the vehicle body a desired distance, providing full access to the body for repairs and maintenance. In some embodiments, the vehicle can be also lifted by a second element towards the rear of the vehicle. The vehicle can then be suspended by support brace, and upper braces 10 ensure that the vehicle body remains stable and does not bend or become damaged when the vehicle is suspended in the air.

Alignments 30 can be attached to a lower edge of braces 10 at any time (e.g., before or after the body is suspended). The alignments can be configured as a permanent part of a brace or can be attached at any desired time using conventional methods, such as screws, bolts, screw-fit attachment, pressure fit attachment, and the like.

Figure 7A:
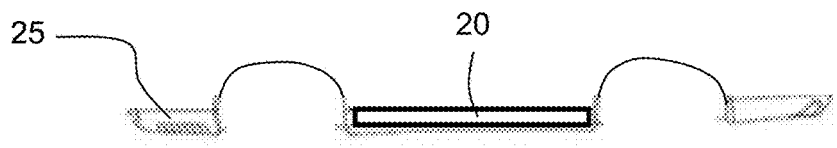
FIG. 7a is a side plan view of a vehicle frame and floorboard with braces installed in accordance with some embodiments of the presently disclosed subject matter.
Figure 7B:
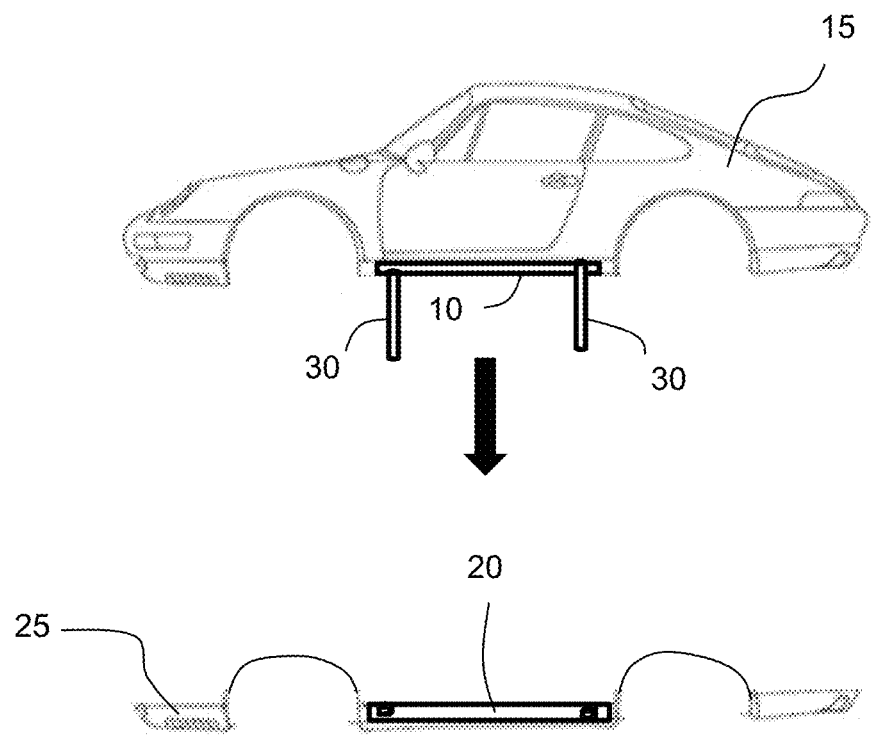
FIG. 7b is a side plan view of a vehicle body being lowered toward a vehicle floorboard and frame unit in accordance with some embodiments of the presently disclosed subject matter.

As shown in FIG. 7*a*, the lower braces can also be attached to the vehicle floorboard-frame unit, parallel to each other. Specifically, the braces can be attached within the interior of the floorboard (e.g., within the vehicle cabin portion where the driver and passengers are positioned when the vehicle is fully assembled). In some embodiments, braces 20 are configured between wheel wells 43, aligning at least partially with upper braces 10. For example, the braces can span about 50-100 percent of the distance 44 between the wheel wells (e.g., about 50, 55, 60, 65, 70, 75, 80, 85, 90, 95, or 100 percent).

Braces 20 can be releasably attached to the interior or exterior side surface of floorboard-frame unit 25 using any conventional method, such as the use of screws, bolts, spot welding, and the like.

Figure 7C:
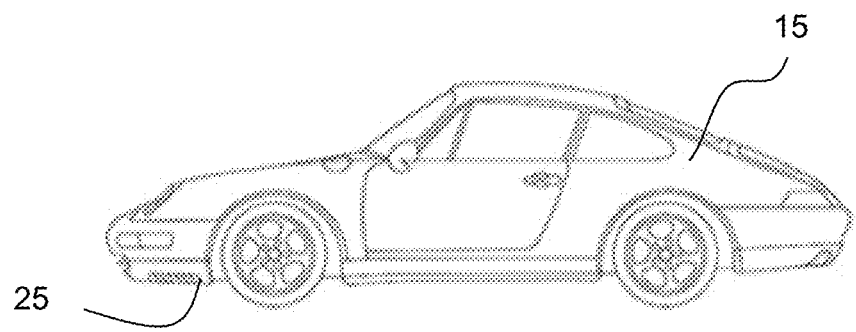
FIG. 7c is a side plan view of a reassembled vehicle in accordance with some embodiments of the presently disclosed subject matter.

The suspended body can then be lowered towards floorboard-frame unit 25 positioned under the body, with alignments 30 providing guidance to the user on the proper positioning of the body relative to the floorboard-frame unit 25. In some embodiments, the alignments can be threaded, such that the user can then raise the floorboard-frame unit to the proper position beneath the vehicle frame to allow the alignment to cooperate with bracket 7. When the alignment is configured as a threaded alignment rod, the rod can be rotated after attachment to the bracket, which automatically drives the floorboard-frame unit towards the body in proper alignment. The floorboard-frame can then be welded to the body (or otherwise attached), as shown in FIG. 7*c*. The alignments and braces 10, 11, and 20 can then be removed and used later with a different vehicle.

Figure 8:
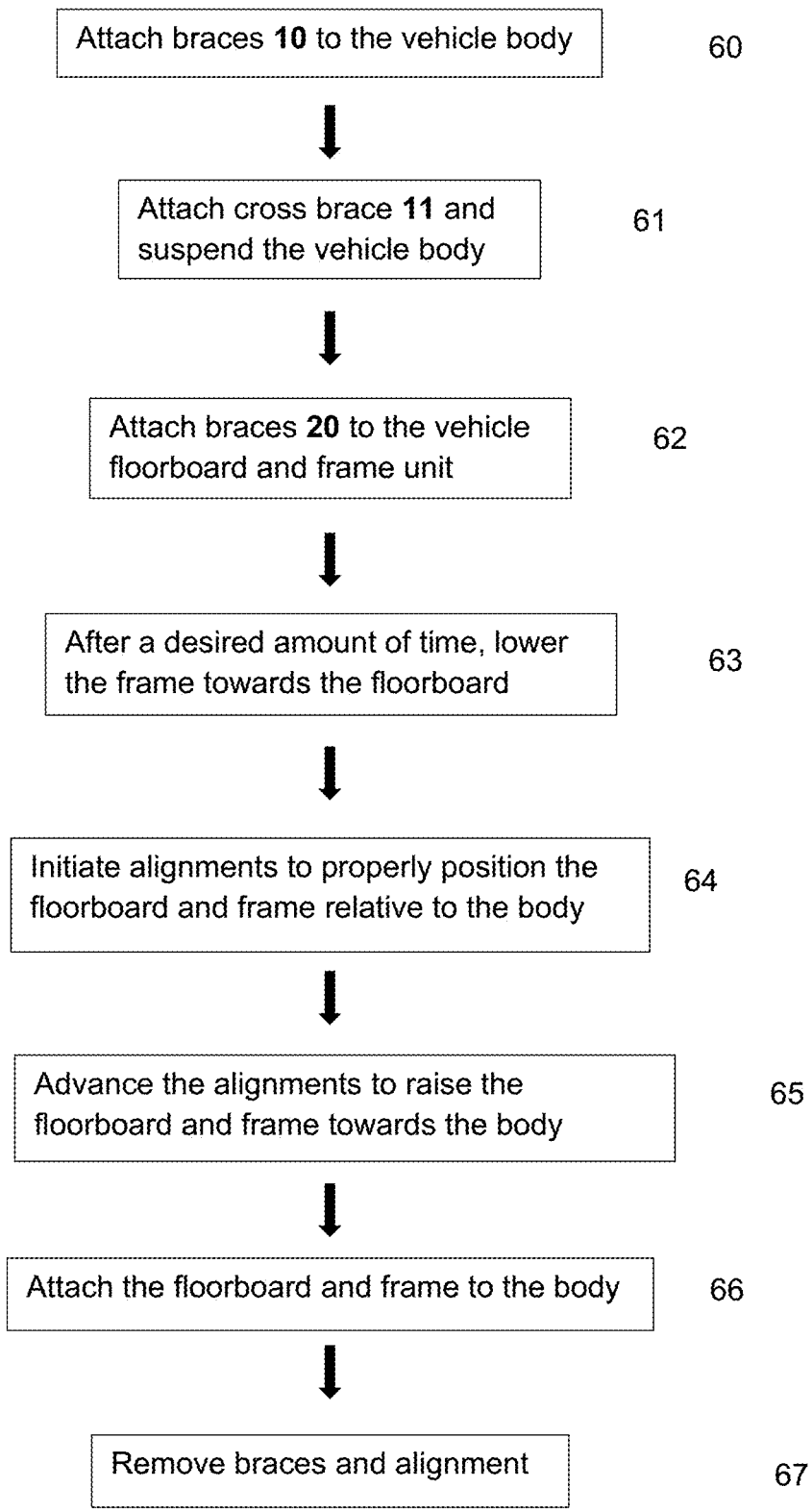
FIG. 8 is a schematic illustrating one method of using the disclosed system.

One method of use is also set out in the schematic of FIG. 8. Specifically, at step 60, braces 10 are attached to the vehicle body using spot welding, mechanical attachments (screws, bolts, etc.), or any other method. In some embodiments, the cross brace is also attached to the frame at step 61. The vehicle body is then suspended to allow the user to perform repairs, work, or maintenance on the frame. Braces 20 are then attached to the floorboard-frame unit at step 62. It should be appreciated that braces 20 can be attached at the same time braces 10 are attached to the frame. At any desired time (e.g., after work has been performed on the frame), the frame can be lowered towards the floorboard at step 63. At any desired time, alignments can be added to braces 10. The alignments can be initiated to properly position the floorboard-frame unit relative to the body at step 64. For example, an alignment rod can be positioned within a threaded bracket in brace 20. The alignments can then be activated (e.g., turned) to advance the floorboard-frame correctly and accurately to a positioned directly below the vehicle body at step 65. At step 66, the floorboard-frame unit can be attached to the body through welding or other conventional methods. The vehicle can be lowered to a support surface (e.g., a floor) and the braces removed from the vehicle at step 67.

The disclosed system provides many advantages over prior art methods of assembling and/or repairing a suspended vehicle. For example, system 5 allows a single user to suspend, support, property position, and attach the floorboard to the frame of a vehicle, providing a huge time savings.

System 5 can be configured in a variety of shapes and sizes, allowing use on many different types of vehicles.

Figure 9:
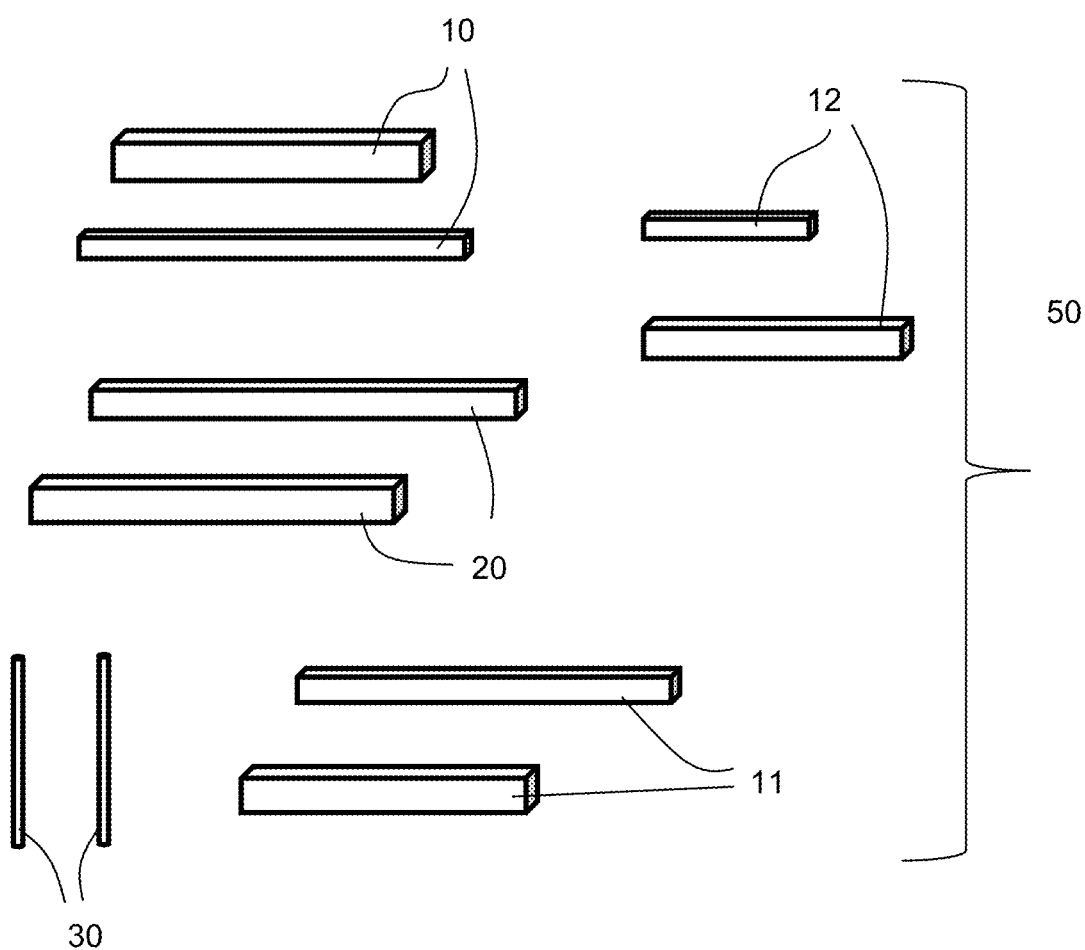
FIG. 9 is a schematic of a system kit in accordance with some embodiments of the presently disclosed subject matter.

The disclosed system can be provided as kit 50, as shown in FIG. 9. For example, a variety of different sized and shaped braces 10, 11, and 20 can be provided, along with inserts 12 if desired. Alignments 30 can also be included, as well as instructions for use.

Advantageously, the braces are easy to install and remove, requiring minimal time and effort by the user.

The disclosed system can be installed and removed from many different vehicles over a time period of many years. Thus, the system is study, reliable, and long-lasting through many cycles of use.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A support and alignment system for use with a vehicle, the system comprising:
 a pair of upper braces with a first end, second end, and length therebetween;

a pair of lower braces with a first end, second end, and length therebetween;

at least one alignment rod attached to each upper brace, extending towards the lower braces, wherein each alignment rod comprises a first end that directly contacts the upper brace, and a second end that cooperates with a fastener positioned on a surface of a corresponding lower brace;

wherein each alignment rod is aligned with a corresponding fastener; and wherein the upper braces, lower braces, or both have an adjustable length, width, or thickness.

2. The support and alignment system of claim 1, further comprising a support brace that contacts the first end of each upper brace.

3. The support and alignment system of claim 1, wherein the alignment rods and brackets are threaded such that each alignment rod can be advanced into a corresponding bracket.

4. The support and alignment system of claim 1, wherein the upper braces have a length, width, and thickness that is about the same as a length, width, and thickness of the lower braces.

5. The support and alignment system of claim 1, wherein the upper braces have a length that differs from the length of the lower braces by about 10-25 percent.

6. The support and alignment system of claim 1, comprising about 1-10 alignment rods.

7. The support and alignment system of claim 1, wherein each alignment rod is permanently attached to an upper brace.

8. The support and alignment system of claim 1, wherein each alignment rod is releasably attached to the upper brace.

9. A vehicle comprising the support system of claim 1, wherein the vehicle is defined by a body and a separate floorboard-frame unit;

wherein the pair of upper braces are releasably attached to a lower edge of the vehicle; and wherein the pair of lower braces are releasably attached to an edge of a floorboard of the vehicle.

10. The vehicle of claim 9, wherein the upper braces are configured parallel to each other, and the lower braces are configured parallel to each other.

11. The vehicle of claim 9, wherein the upper braces, lower braces, or both have an adjustable length, width, or thickness.

12. A method of supporting and aligning a frame and floorboard in a vehicle with a separated body and floorboard-frame unit, the method comprising:

installing the pair of upper braces of a support and alignment system on a lower edge of the vehicle frame;

installing the pair of lower braces support and alignment system on an edge of the floorboard;

wherein the support and alignment system comprises:

a pair of upper braces with a first end, second end, and length therebetween;

a pair of lower braces with a first end, second end, and length therebetween;

at least one alignment rod attached to each upper brace, wherein each alignment rod comprises a first end that directly contacts the upper brace, and a second end that cooperates with a bracket positioned on a surface of a corresponding lower brace;

suspending the body in the air;

positioning each alignment rod within a corresponding bracket on a lower brace; and advancing the lower braces and floorboard-frame unit towards the upper braces and body;

wherein the frame is supported during suspension by the upper braces; and wherein the body and floorboard-frame unit are aligned by positioning the alignment rods within corresponding brackets on a lower brace.

13. The method of claim 12, wherein the upper braces are configured parallel to each other, and the lower braces are configured parallel to each other.

14. The method of claim 12, further comprising attaching a support brace perpendicularly to each upper brace.

15. The method of claim 12, wherein the upper and lower braces are removed from the frame and floorboard.

16. A kit comprising:

a plurality of upper braces, each with a first end, second end, and length therebetween;

a plurality of lower braces, each with a first end, second end, and length therebetween;

a plurality of alignment rods, each comprising a first end that directly contacts a lower brace and a second end that cooperates with an aperture positioned on a surface of a corresponding upper brace; and a plurality of support braces, each comprising a first end and a second end;

wherein the upper braces, lower braces, support braces, or combinations thereof have an adjustable length, width, or thickness.

17. The kit of claim 16, wherein each alignment rod is permanently attached to an upper brace.

18. The kit of claim 16, wherein each alignment rod is releasably attached to an upper brace.

* * * * *